United States Patent [19]

Colle et al.

[11] Patent Number: 6,028,233
[45] Date of Patent: *Feb. 22, 2000

[54] METHOD FOR INHIBITING HYDRATE FORMATION

[75] Inventors: Karla Schall Colle, Houston, Tex.; Christine Ann Costello, Easton, Pa.; Enock Berluche, Phillipsburg, N.J.; Russell Harlan Oelfke, Houston; Larry Dalton Talley, Friendswood, both of Tex.

[73] Assignee: Exxon Production Research Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,277

[22] Filed: Mar. 28, 1996

Related U.S. Application Data

[60] Provisional application No. 60/000,065, Jun. 8, 1995.

[51] Int. Cl.⁷ .............................. C07C 7/20; F17D 1/05
[52] U.S. Cl. ........................ 585/15; 585/950; 95/153; 166/310; 166/371; 137/3; 137/13
[58] Field of Search .................. 585/15, 950; 95/153; 166/310, 371; 137/3, 13

[56] References Cited

U.S. PATENT DOCUMENTS

| | | | |
|---|---|---|---|
| H1749 | 9/1998 | Colle et al. ................................ | 585/15 |
| 3,696,085 | 10/1972 | Lederer et al. ........................ | 260/80.3 |
| 4,132,535 | 1/1979 | Rivers, Jr. et al. ......................... | 55/23 |
| 4,260,714 | 4/1981 | Wingard, Jr. et al. ................... | 526/384 |
| 4,502,966 | 3/1985 | Giddings et al. ...................... | 252/8.5 C |
| 4,521,579 | 6/1985 | Engelhardt et al. ..................... | 526/287 |
| 4,644,042 | 2/1987 | Ueda et al. .............................. | 526/204 |
| 4,856,593 | 8/1989 | Matthews et al. ....................... | 106/310 |
| 4,915,176 | 4/1990 | Sugier et al. ............................ | 166/371 |
| 4,929,425 | 5/1990 | Hoots et al. .............................. | 422/13 |
| 4,973,775 | 11/1990 | Sugier et al. ............................ | 585/15 |
| 5,244,878 | 9/1993 | Sugier et al. ............................ | 507/90 |
| 5,331,105 | 7/1994 | Duncum et al. ........................ | 585/800 |
| 5,420,370 | 5/1995 | Sloan, Jr. ................................ | 585/15 |
| 5,426,258 | 6/1995 | Thomas et al. ........................... | 585/15 |
| 5,432,292 | 7/1995 | Sloan, Jr. ................................ | 585/15 |
| 5,434,323 | 7/1995 | Durand et al. ........................... | 585/15 |
| 5,491,269 | 2/1996 | Colle et al. .............................. | 585/15 |
| 5,583,273 | 12/1996 | Colle et al. .............................. | 585/15 |
| 5,600,044 | 2/1997 | Colle et al. .............................. | 585/15 |
| 5,639,925 | 6/1997 | Sloan, Jr. et al. ........................ | 585/15 |
| 5,744,665 | 4/1998 | Costello et al. .......................... | 585/15 |
| 5,817,898 | 10/1998 | Delion et al. ............................ | 585/15 |
| 5,841,010 | 11/1998 | Rabeony et al. ............................ | 585/3 |
| 5,874,660 | 2/1999 | Colle et al. .............................. | 585/15 |
| 5,900,516 | 5/1999 | Talley et al. ............................. | 585/15 |

FOREIGN PATENT DOCUMENTS

| | | | |
|---|---|---|---|
| 1251892 | 3/1989 | Canada .................................. | 402/526 |
| 2178366 | 12/1996 | Canada . | |
| 84307460 | 6/1985 | European Pat. Off. .................... | 26/2 |
| 88308726 | 3/1989 | European Pat. Off. ...................... | 37/6 |
| 5-229071 | 3/1995 | Japan .............................. | C08F 26/02 |
| 7-82320 | 3/1995 | Japan .................................. | 26/2 |
| 1158539 | 7/1969 | United Kingdom . | |
| 2 102 441 | 2/1983 | United Kingdom ....................... | 226/2 |
| PCT/US89/00523 | 9/1989 | WIPO .......................... | C07C 102/04 |
| PCT/EP93/01519 | 12/1993 | WIPO ............................. | E21B 37/06 |
| PCT/US95/06042 | 11/1995 | WIPO ............................. | E21B 37/06 |
| WO 96/41786 | 12/1996 | WIPO ............................. | C07C 7/20 |

OTHER PUBLICATIONS

A. I. Aksenov, N.B. Kondratyev, N.V. Demidova, E.P. Prokofyev, A.M. Ovsepyan, E.E. Lavut, V.P. Panov, Yu. E. Kirsh,.and P.M. Kochergin: "Synthesis and Structure of N–Alkyl–N–Vinyl Carboxamides", Zhurnal Obshchei Khimii, vol. 57, No. 2, pp. 1634–1637 (1987), UDC 547.29: 542.95.

*Polymers In Aqueous Media—Performance Through Association Advances in Chemistry Series*, 223, American Chemical Society Washington, DC, 1989,D. N. Schulz et al., Chp 9 "Copolymers of N–Vinylpyrrolidone and Sulfonate Monomers", pp. 165–174.

Shoji Ito, "Phase Transition of Aqueous Solution of Poly(N–Alkylacrylamide) Derivatives ÄÄ Effects of Side Chain Structure ÄÄ", *Kobunshi Ronbunshu*, 46(7):437–443, Jul. 1989.

F.M. Menger, A.V. Eliseev, and V.A. Migulin, "Phosphatase Catalysis Developed via Combinatorial Organic Chemistry", J. Org. Chem., pp. 6666–6667, Oct. 20, 1995.

Sandler & Karo, *Polymer Syntheses* vol. 1, Chp 12, "Polyacrylamide and Related Amides", pp. 419–459 (No Date Available).

Rudy Baum, "Combinatorial Chemistry", *Chemical & Engineering News*, Feb. 12, 1996, pp. 28–54.

"Kinetic Inhibition of Natural Gas Hydrates in Offshore Drilling, Production, and Processing", E. D. Sloan, Jr. et al., Draft Report mailed to each member of the Colorado School of Mines Gas Hydrate Consotrtium on Jan. 2, 1996.

*Primary Examiner*—Walter D. Griffin
*Attorney, Agent, or Firm*—Kurt D. VanTassel; Denise Y. Wolfs

[57] ABSTRACT

A method for inhibiting the formation of clathrate hydrates in a fluid having hydrate forming constituents is claimed. More specifically, the method can be used in treating a petroleum fluid stream such as natural gas conveyed in a pipe to inhibit the formation of a hydrate restriction in the pipe. The hydrate inhibitors used for practicing the method comprise substantially water soluble polymers having N-vinyl amide or N-allyl amide units. Specific examples of such copolymers include, N-vinyl-N-methylacetamide (VIMA) copolymerized with acryloylpyrrolidine (APYD) or acryloylpiperidine (APID), and more preferably, VIMA copolymerized with N-substituted methacrylamides, such as N-isopropylmethacrylamide (iPMAM) and methacryloylpyrrolidine (MAPYD) to produce inhibitors for practicing the claimed method.

27 Claims, No Drawings

METHOD FOR INHIBITING HYDRATE FORMATION

This application is based on U.S. provisional patent application, Ser. No. 60/000,065, filed in the name of K.S. Colle et al. on Jun. 8, 1995, and is related to U.S. patent application, Ser. No. 08/539,033 filed Oct. 4, 1995, now U.S. Pat. No. 5,874,665 based on U.S. provisional application 60/000,053 filed Jun. 8, 1995.

FIELD OF THE INVENTION

The present invention relates to a method for inhibiting the formation of clathrate hydrates in a fluid. More specifically, the invention relates to a method for inhibiting the formation of gas hydrates in a pipe used to convey oil or gas.

BACKGROUND OF THE INVENTION

Carbon dioxide, hydrogen sulfide, and various hydrocarbons, such as methane, ethane, propane, normal butane and isobutane, are present in natural gas and other petroleum fluids. However, water is typically found mixed in varying amounts with such petroleum fluid constituents. Under conditions of elevated pressure and reduced temperature clathrate hydrates can form when such petroleum fluid constituents or other hydrate formers are mixed with water. Clathrate hydrates are water crystals which form a cage-like structure around guest molecules such as hydrate forming hydrocarbons or gases. Some hydrate forming hydrocarbons include, but are not limited to, methane, ethane, propane, isobutane, butane, neopentane, ethylene, propylene, isobutylene, cyclopropane, cyclobutane, cyclopentane, cyclohexane, and benzene. Some hydrate forming gases include, but are not limited to, oxygen, nitrogen, hydrogen sulfide, carbon dioxide, sulfur dioxide, and chlorine.

Gas hydrate crystals or gas hydrates are a class of clathrate hydrates of particular interest to the petroleum industry because of the pipeline blockages that they can produce during the production and/or transport of the natural gas and other petroleum fluids. For example, at a pressure of about 1MPa ethane can form gas hydrates at temperatures below 4° C., and at a pressure of 3MPa ethane can form gas hydrates at temperatures below 14° C. Such temperatures and pressures are not uncommon for many operating environments where natural gas and other petroleum fluids are produced and transported.

As gas hydrates agglomerate they can produce hydrate blockages in the pipe or conduit used to produce and/or transport natural gas or other petroleum fluid. The formation of such hydrate blockages can lead to a shutdown in production and thus substantial financial losses. Furthermore, restarting a shutdown facility, particularly an offshore production or transport facility, can be difficult because significant amounts of time, energy, and materials, as well as various engineering adjustments, are often required to safely remove the hydrate blockage.

A variety of measures have been used by the oil and gas industry to prevent the formation of hydrate blockages in oil or gas streams. Such measures include maintaining the temperature and/or pressure outside hydrate formation conditions and introducing an antifreeze such as methanol, ethanol, propanol, or ethylene glycol. From an engineering standpoint, maintaining temperature and/or pressure outside hydrate formation conditions requires design and equipment modifications, such as insulated or jacketed piping. Such modifications are costly to implement and maintain. The amount of antifreeze required to prevent hydrate blockages is typically between 10% to 30% by weight of the water present in the oil or gas stream. Consequently, several thousand gallons per day of such solvents can be required. Such quantities present handling, storage, recovery, and potential toxicity issues to deal with. Moreover, these solvents are difficult to completely recover from the production or transportation stream.

Consequently, there is a need for a gas hydrate inhibitor that can be conveniently mixed at low concentrations in the produced or transported petroleum fluids. Such an inhibitor should reduce the rate of nucleation, growth, and/or agglomeration of gas hydrate crystals in a petroleum fluid stream and thereby inhibit the formation of a hydrate blockage in the pipe conveying the petroleum fluid stream.

One method of practicing the present invention uses gas hydrate inhibitors which can be used in the concentration range of about 0.01% to about 5% by weight of the water present in the oil or gas stream. As discussed more fully below, the inhibitors of this invention can effectively treat a petroleum fluid having a water phase.

SUMMARY OF THE INVENTION

According to the invention there is provided a method for inhibiting the formation of clathrate hydrates in a fluid having hydrate forming constituents. One embodiment of the method comprises treating said fluid with an inhibitor comprising a substantially water soluble polymer having the following N-vinyl amide unit:

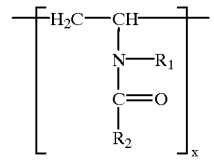

where, $R_1$ is a hydrogen or hydrocarbon group having one to six carbon atoms, $R_2$ is a hydrocarbon group having one to six carbon atoms, wherein $R_1$ and $R_2$ have a sum total of carbon atoms greater than or equal to one, but less than eight, and x is an average number of units for producing an average molecular weight for said polymer between about 1,000 and about 6,000,000.

Other polymers of N-vinyl amides useful for practicing the invention include copolymers and terpolymers of N-vinyl amides with other N-vinyl amide monomers, acrylamides, maleimides, acrylates, vinyl carboxylates, and alkenyl cyclic imino ethers.

A second embodiment of the method comprises treating said fluid with an inhibitor comprising a substantially water soluble polymer having the following N-allyl amide unit:

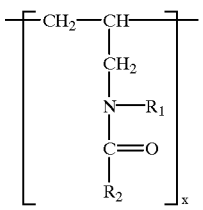

where,

R₁ is a hydrogen or hydrocarbon group having one to six carbon atoms,

R₂ is a hydrocarbon group having one to six carbon atoms, wherein R₁ and R₂ have a sum total of carbon atoms greater than or equal to one, but less than eight, and x is an average number of units for producing an average molecular weight for said polymer between about 1,000 and about 6,000,000.

Copolymers and terpolymers of N-allyl amides useful for practicing the invention include polymerizing a first N-allyl amide with a second N-allyl amide or polymerizing a first N-allyl amide with a second and third N-allyl amide, respectively.

DETAILED DESCRIPTION OF THE INVENTION

INVENTIVE METHOD

The inventive method inhibits the formation of clathrate hydrates in a fluid having hydrate forming constituents. Formation of clathrate hydrates means the nucleation, growth, and/or agglomeration of clathrate hydrates. Such clathrate hydrates may be formed in a fluid whether it is flowing or substantially stationary, but are often most problematic in flowing fluid streams conveyed in a pipe. For example, flow restrictions arising from partial or complete blockages in a fluid stream can arise as clathrate hydrates adhere to and accumulate along the inside wall of the pipe used to convey the fluid. Nonetheless, the invention can be used for inhibiting formation of clathrate hydrates in substantially stationary fluids.

In one embodiment of the invention, a concentrated solution or mixture of one or more of the inhibitors of the type described below is introduced into a petroleum fluid stream having an aqueous phase. As the inhibitor solution or mixture of this invention is substantially dissolved in the aqueous phase or dispersed in the fluid stream it reduces the rate that clathrate hydrates are formed, and thereby reduces the tendency for a flow restriction to occur.

In a preferred embodiment, the solid polymer is first dissolved into an appropriate carrier solvent or liquid to make a concentrated solution or mixture. It should be understood that many liquids may effectively facilitate treatment of the fluid stream without dissolving the inhibitor. Many liquids, however, will preferably dissolve the inhibitor and, for convenience, are referred to hereafter as solvents whether they produce an inhibitor solution, emulsion, or other type of mixture. The solvent's principal purpose is to act as a carrier for the inhibitor and to facilitate the inhibitor's absorption into the aqueous phase of the petroleum fluid. Any solvent suitable for delivering the inhibitor to the fluid's aqueous phase may be used. Such carrier solvents include, but are not limited to, water, brine, sea water, produced water, methanol, ethanol, propanol, isopropanol, glycol, or mixtures of such solvents. Other solvents familiar to those skilled in the art may also be used.

It should be understood that the use of a carrier solvent is not required to practice the invention, but it is a convenient method of introducing the inhibitor into the fluid. In many applications the use of a carrier solvent will facilitate treatment of the fluid stream.

Any convenient concentration of inhibitor in the carrier solvent can be used, so long as it results in the desired final concentration in the aqueous phase of the petroleum fluid. Higher concentrations are preferred, since they result in a reduced volume of concentrated solution to handle and introduce into the petroleum fluid. The actual concentration used in a specific application will vary depending upon the selection of carrier solvent, the chemical composition of the inhibitor, the system temperature, and the inhibitor's solubility in the carrier solvent at application conditions.

The inhibitor mixture is introduced into the aqueous phase of the petroleum fluid using mechanical equipment, such as chemical injection pumps, piping tees, injection fittings, and other devices which will be apparent to those skilled in the art. However, such equipment is not essential to practicing the invention. To ensure an efficient and effective treatment of the petroleum fluid with the inhibitor mixture two points should be considered.

First, an aqueous phase is preferably present at the location the inhibitor solution is introduced into the fluid. In some petroleum fluid systems (particularly natural gas systems), an aqueous phase does not appear until the gas has cooled sufficiently for water to condense. If this is the case, the inhibitor solution is preferably introduced after the water has condensed. Alternatively, in the event that an aqueous phase is not available at the point the inhibitor solution is introduced, the inhibitor solution concentration should be selected to ensure that the inhibitor solution's viscosity is sufficiently low to facilitate its dispersion through the fluid and permit it to reach the aqueous phase.

Second, because the inhibitor primarily serves to inhibit the formation of clathrate hydrates, rather than reverse such formation, it is important to treat the fluid prior to substantial formation of clathrate hydrates. As a wet petroleum fluid cools it will eventually reach a temperature, known as the hydrate equilibrium dissociation temperature or $T_{eq}$, below which hydrate formation is thermodynamically favored. A petroleum fluid's $T_{eq}$ will shift as the pressure applied to the fluid and its composition change. Various methods of determining a fluid's $T_{eq}$ at various fluid compositions and pressures are well known to those skilled in the art. Preferably, the fluid should be treated with the inhibitor when the fluid is at a temperature greater than its $T_{eq}$. It is possible, but not preferable, to introduce the inhibitor while the temperature is at or slightly below the fluid's $T_{eq}$, preferably before clathrate hydrates have begun to form.

The quantity of inhibitor introduced into a petroleum fluid with an aqueous phase solvent will typically vary between about 0.01 wt % to about 5 wt % by weight of the water present in the fluid. Preferably, the inhibitor concentration will be about 0.5 wt %. For example, a laboratory study has shown that adding 0.5 wt % of a copolymer of N-methyl-N-vinylacetamide and acryloylpyrrolidine (VIMA/APYD) to a petroleum fluid allowed the fluid to cool to a temperature which was about 15.5° C. below its $T_{eq}$ without rapid formation of a hydrate blockage. A higher inhibitor concentration can be used to lower the temperature at which a hydrate blockage is obtained. A suitable concentration for a particular application, however, can be determined by those skilled in the art by taking into account the inhibitor's performance under such application, the degree of inhibition required for the petroleum fluid, and the inhibitor's cost.

INHIBITOR DESCRIPTION

Compounds belonging to the group of homopolymers, copolymers, and terpolymers of N-vinyl amides, and mixtures thereof, are very effective inhibitors of hydrate nucleation, growth, and/or agglomeration (collectively referred to as hydrate formation). A generic structure for such classes of polymers having a N-vinyl amide unit is depicted as follows:

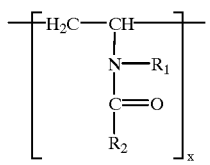

where, $R_1$ is a hydrogen or hydrocarbon group having one to six carbon atoms, $R_2$ is a hydrocarbon group having one to six carbon atoms, wherein $R_1$ and $R_2$ have a sum total of carbon atoms greater than or equal to one, but less than eight, and x is an average number of units for producing an average molecular weight for said polymer between about 1,000 and about 6,000,000.

The $R_1$ and $R_2$ carbon atoms may be branched, normal, or cyclic wherein $R_1$ may be either a hydrogen or an alkyl, cycloalkyl, or an aryl group having one to six carbon atoms and zero to two heteroatoms selected from the group consisting of oxygen and nitrogen and combinations thereof, and $R_2$ is an alkyl, cycloalkyl, or an aryl group having one to six carbon atoms and zero to two heteroatoms selected from the group consisting of oxygen and nitrogen and combinations thereof.

Other polymers of N-vinyl amides useful for practicing the invention include copolymers and terpolymers of N-vinyl amides with other N-vinyl amide monomers, acrylamides, maleimides, acrylates, vinyl carboxylates, and alkenyl cyclic imino ethers.

Also, compounds belonging to the group of homopolymers and copolymers of N-allyl amides, and mixtures thereof, are expected to be effective inhibitors of hydrate formation. A generic structure for these classes of N-allyl amide polymers is depicted as follows:

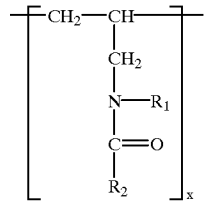

where, $R_1$ is a hydrogen or hydrocarbon group having one to six carbon atoms, $R_2$ is a hydrocarbon group having one to six carbon atoms, wherein $R_1$ and $R_2$ have a sum total of carbon atoms greater than or equal to one, but less than eight, and x is an average number of units for producing an average molecular weight for said polymer between about 1,000 and about 6,000,000.

The $R_1$ and $R_2$ carbon atoms may be branched, normal, or cyclic wherein $R_1$ may be either a hydrogen or an alkyl, cycloalkyl, or an aryl group having one to six carbon atoms and zero to two heteroatoms selected from the group consisting of oxygen and nitrogen and combinations thereof, and $R_2$ is an alkyl, cycloalkyl, or an aryl group having one to six carbon atoms and zero to two heteroatoms selected from the group consisting of oxygen and nitrogen and combinations thereof.

Copolymers and terpolymers of N-allyl amides useful for practicing the invention include polymerizing a first N-allyl amide with a second N-allyl amide or polymerizing a first N-allyl amide with a second and third N-allyl amide, respectively.

It should be understood that the generic names used to identify the class of polymers contemplated for practicing the invention claimed herein, such as polymers of N-vinyl amides or poly(N-vinyl amides) and polymers of N-allyl amides or poly(N-allyl amides), are selected for convenience of discussion. These generic names are intended to cover any substantially water soluble polymers including, but not limited to, homopolymers, copolymers, terpolymers, other complex polymers, and blends or mixtures thereof, having the structural units described above, whether such structural units or their related monomers were used to synthesize the polymer or not. The monomers disclosed below for synthesizing the polymers of the claimed invention are preferred examples of the starting materials and are not intended to limit the scope of the claims. Other starting materials and synthesis techniques, which are currently known or may become known, will be apparent to those skilled in the art as alternatives to synthesizing the polymers of the claimed invention. Accordingly, all polymers having at least the structural unit identified in the claims below, even though such polymers may be produced from starting materials and/or by means not explicitly referenced herein, are intended to fall within the scope of the claimed invention.

Other polymers not specifically identified in the examples below will become apparent to those skilled in the art in light of the detailed discussion below. Such polymers are intended to fall within the scope of the claimed invention.

Copolymers of N-vinyl amides comprise an N-vinyl amide monomer copolymerized with another vinyl monomer. The other vinyl monomer can be chosen from a class of monomers including, but not limited to, other N-vinyl amides, acrylamides, maleimides, acrylates, vinyl carboxylates and alkenylcyclic imino ethers, such that the resultant copolymer is substantially water soluble. For example, N-vinyl-N-methylacetamide (VIMA) is copolymerized preferably with various N-substituted acrylamides, such as acryloylpyrrolidine (APYD) or acryloylpiperidine (APID), and more preferably, is copolymerized with N-substituted methacrylamides, such as N-isopropylmethacrylamide (iPMAM) and methacryloylpyrrolidine (MAPYD) to produce copolymers in the class described above.

The above-described N-vinyl amide homopolymers and copolymers could be used in a mixture with other polymers or additives useful for enhancing inhibitor performance, including but not limited to, various polymers, such as poly(vinylpyrrolidone) (PVP), poly(vinylcaprolactam) (PVCap), copolymers of PVP and PVCap, other homopolymers and copolymers of N-vinylamides, homopolymers and copolymers of N-allylamides; various surfactants, such as sodium n-butyl sulfate, sodium n-butyl sulfonate, sodium n-octyl sulfonate, sodium n-pentanoate; various alcohols, such as methanol, ethanol, propanols, and butanols; and various alkyl zwitterions having one to ten carbon atoms, such as butyl zwitterion, as identified below,

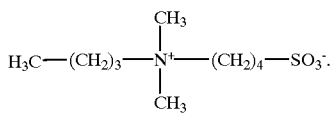

Copolymers of N-allyl amides would comprise a first N-allyl amide of the class described above copolymerized with a second N-allyl amide of the class described above. Also, the above-described N-allyl amide homopolymers and copolymers could be used in a mixture with other polymers or additives useful for enhancing inhibitor performance, including but not limited to, various polymers, such as poly(vinylpyrrolidone) (PVP), poly(vinylcaprolactam) (PVCap), copolymers of PVP and PVCap, homopolymers and copolymers of N-vinylamides, and other homopolymers and copolymers of N-allylamides; various surfactants, such as sodium n-butyl sulfate, sodium n-butyl sulfonate, sodium n-octyl sulfonate, sodium n-pentanoate; various alcohols, such as methanol, ethanols, propanols, and butanols; and various alkyl zwitterions having one to ten carbon atoms, such as butyl zwitterion, as identified below,

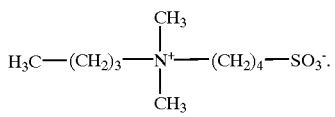

POLY(N-vinyl amide) EXAMPLES

Without limiting the scope of the invention, and for the purpose of illustrating the invention, various N-vinyl amide polymers and copolymers were evaluated, including poly (N-methyl-N-vinylacetamide) (PVIMA), copolymers of N-methyl-N-vinylacetamide and diethylacrylamide (VIMA/DEAM), copolymers of N-methyl-N-vinylacetamide and N-isopropyl methacrylamide (VIMA/iPMAM), copolymers of N-methyl-N-vinylacetamide and acryloylpyrrolidine (VIMA/APYD), copolymers of N-methyl-N-vinylacetamide and methacryloylpyrrolidine (VIMA/MAPYD), copolymers of N-methyl-N-vinylacetamide and acryloylhexamethyleneimine (AHMI), copolymers of N-methyl-N-vinylacetamide and acryloylpiperidine (VIMA/APID), copolymers of N-methyl-N-vinylacetamide and vinyl butyrate (VIMA/VBu), copolymers of N-methyl-N-vinylacetamide and ethyl maleimide (VIMA/EME) and terpolymers of N-methyl-N-vinylacetamide, N,N-dimethylacrylamide and ethyl maleimide (VIMA/DMAM/EME). The above-identified N-vinyl amide homopolymers and copolymer structures are depicted below:

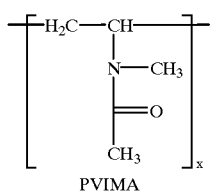
PVIMA

-continued

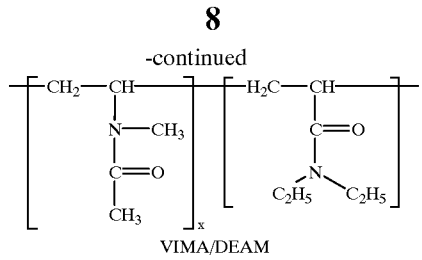
VIMA/DEAM

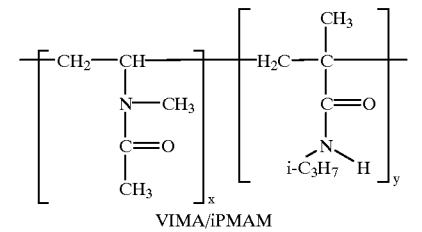
VIMA/iPMAM

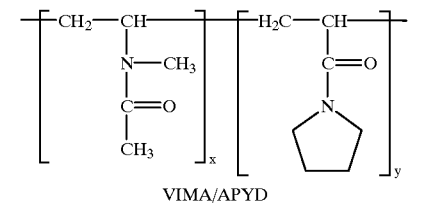
VIMA/APYD

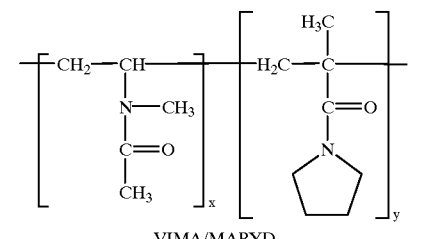
VIMA/MAPYD

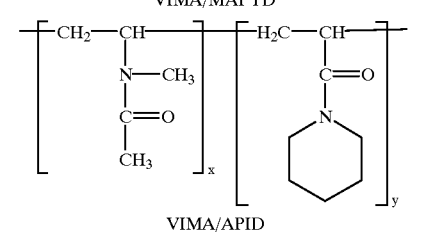
VIMA/APID

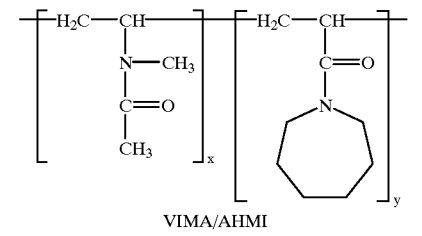
VIMA/AHMI

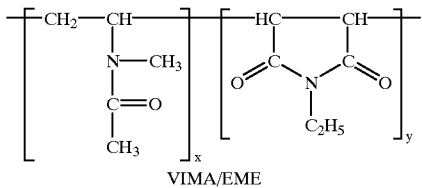
VIMA/EME

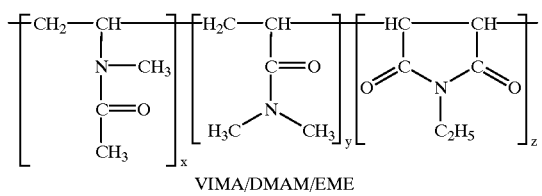
VIMA/DMAM/EME

-continued

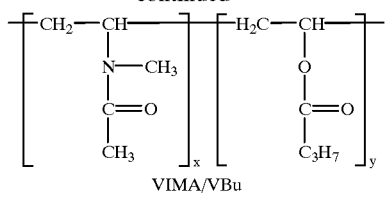
VIMA/VBu

Other N-vinyl amide homopolymers and copolymers of interest but not yet evaluated include the following polymers:

poly (N-vinylpropionamide)

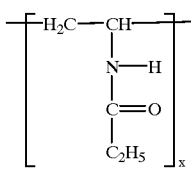

poly(N-vinyl-N-n-propylpropionamide)

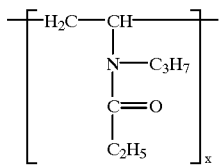

copolymer of N-vinylpropionamide and N-methyl-N-vinylacetamide

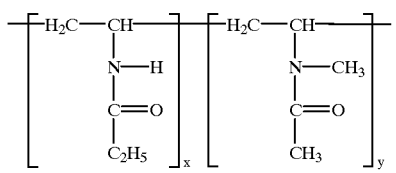

copolymer of N-vinyl-N-n-propylpropionamide and N-methyl-N-vinylacetamide

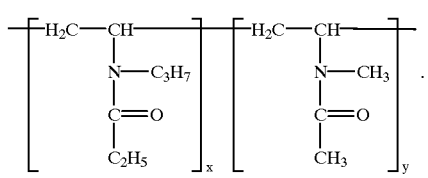

POLY(N-allyl amide) EXAMPLES

Without limiting the scope of the invention, and for the purpose of illustrating selected N-allyl amide polymers for practicing the invention, various homopolymers and copolymers in the class that are preferred candidates for inhibitor evaluation include the polymers described immediately below.

A preferred class of N-allyl amide homopolymer candidates for evaluation include:

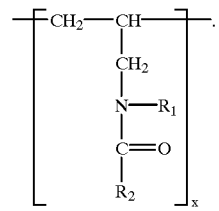

where $R_1$=H or a hydrocarbon group having one to three carbon atoms and $R_2$=a hydrocarbon group having one to three carbon atoms, wherein $R_1$ and $R_2$ have a sum total of carbon atoms greater than or equal to one, but less than eight, and x is an average number of monomeric units for producing an average molecular weight of between about 1,000 and about 6,000,000 for the homopolymer; more preferably, however, $R_1$=H and $R_2$=a hydrocarbon group having one to three carbon atoms; and most preferably, $R_1$=H and $R_2$=a hydrocarbon group having three carbon atoms.

A preferred class of N-allyl amide coopolymer candidates for evaluation include:

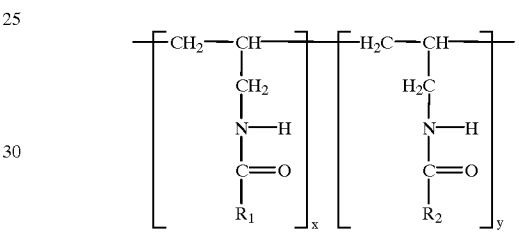

where $R_1$=H or a hydrocarbon group having one to three carbon atoms and $R_2$=a hydrocarbon group having one to three carbon atoms, wherein $R_1 \neq R_2$ and $R_1$ and $R_2$ have a sum total of carbon atoms greater than or equal to one, but less than eight, and the sum of x and y yields an average number of units for producing an average molecular weight of between about 1,000 and about 6,000,000 for the copolymer.

INHIBITOR SYNTHESIS

General Synthesis Procedure for Poly(N-vinyl amides)

N-methyl-N-vinylacetamide (VIMA) is commercially available or may be synthesized according to published procedures (see e.g., A. I. Askenov, et al , *Zhurnal Obschei Khimii*, 57 (2), pp. 1634–1637 (1987)). Many of the vinyl monomers used in synthesizing various VIMA copolymers described below are commercially available. Acrylamide monomers which were not available were synthesized from the appropriate amine and acryloyl chloride according to published procedures (see e.g., S. Ito, *Kobunshi Ronbunshu*, 46 (7), pp. 437–443 (1989)).

Alternatively, poly(N-vinyl amide) homopolymers can be synthesized by functionalization of poly(vinyl amine). This technique is described by Akashi et al. in Japanese Patent Kokai 7[1995] and also by T. Fischer and W. Heitz in *Macromol. Chem. Phys.*, 195(2), 1994, 679–687. The technique consists of acylating the amine group of poly(vinyl amine) by reaction with an acyl chloride or a carboxylic acid.

Standard laboratory procedures familiar to those skilled in the art were used to synthesize the evaluated polymers and copolymers identified above. Benzene or low molecular weight alcohols were used as reaction solvents. Many common azo free radical initiators, such as 2,2'-Azobis(2-methylpropionitrile), also known as AIBN, can be used for synthesizing poly(N-vinyl amides). The polymers were isolated and characterized using techniques well-known to those skilled in the art, such as carbon-13 ($^{13}$C) and proton ($^1$H) nuclear magnetic resonance spectroscopy (NMR) and gel permeation chromatography (GPC), to confirm their structures. Some examples of synthesis procedures that may be adapted to synthesizing other polymers and copolymers similar to those identified above are provided below.

Polymerization of N-methyl-N-vinylacetamide (VIMA)

t-Butanol was dried overnight over activated molecular sieves and then purged for about 4 hours with a stream of dry nitrogen gas. A 250 mL flask equipped with an overhead stirrer, condenser with drying tube, thermometer and nitrogen inlet was purged with nitrogen. 25.0 g (0.25 moles) N-methyl-N-vinylacetamide (Aldrich) was loaded into the flask with about 100 mL t-butanol. 0.46 g (0.0028 moles) AIBN (Eastman) was added and the reaction heated at 65° C. for about 8 hours. The reaction was cooled and the product isolated by vacuum evaporation of the solvent. The product was characterized by $^{13}$C NMR and GPC.

Polymerization of Other N-Vinyl Amide Monomers

Other N-vinyl amide monomers may be used to produce higher analogs of N-vinyl amide homopolymers, such as poly(N-vinylpropionamide) and poly(N-vinyl-N-n-propylpropionamide), and other copolymers according to published procedures known to those skilled in the art of polymer synthesis, see e.g., A. I. Askenov, et al, *Zhurnal Obschei Khimii*, 57 (2), pp. 1634–1637 (1987), Hartwimmer et al, U.S. Pat. No. 3,531,471, and Lederer et al., U.S. Pat. No. 3,696,085.

Copolymerization of N-methyl-N-vinylacetamide and Substituted Acrylamides

In general, the copolymerization of VIMA with acrylamides, specifically N-substituted (or N,N disubstituted) acrylamides is slow. Thus, if the two monomers are charged together in a batch copolymerization, the N-substituted acrylamide will polymerize to some extent, as a homopolymer, or at least a copolymer that is very rich in the acrylamide. To alleviate this problem, a pumping process is used to ensure that the VIMA is substantially incorporated into the copolymer. In general, the VIMA is charged to a reactor with initiator. The "faster" reacting monomer, the N-substituted acrylamide, is pumped into the VIMA solution. The optimum addition time is based on the relative reactivity of the comonomers. For our purposes, a pumping time of two to four hours was adequate. An example of this procedure is given below for the copolymerization of N-methyl-N-vinylacetamide (VIMA) and N-isopropylmethacrylamide (iPMAM) to produce a VIMA/iPMAM copolymer.

Copolymerization of N-methyl-N-vinylacetamide (VIMA) and N-isopropylmethacrylamide (iPMAM)

N-isopropylmethacrylamide was purchased from Aldrich and recrystallized twice from hexane. Anhydrous benzene was purchased from Aldrich and used without further purification. All transfers were done under an inert atmosphere. N-vinyl-N-methylacetamide was purchased from Aldrich and purified by fractional distillation. AIBN was recrystallized from methanol.

VIMA (8.43 g (0.066 mol)) was passed through a commercially available inhibitor removal column and dissolved in benzene (45 ml). This solution was charged to a 3-necked flask equipped with a condenser, stirrer, nitrogen inlet/outlet, and a port through which the iPMAM was pumped. The VIMA/benzene solution was purged further with $N_2$ for ½ hour. A solution of iPMAM (6.57g (0.663 mol) in 90 ml benzene) was purged for ½ hour, then charged to a syringe pump. After purging the reaction kettle containing the VIMA solution, it was brought to 60° C. The reaction was initiated by injecting an AIBN solution (0.115 g in 2 cc benzene) into the VIMA solution. Then the NiPMAM solution was pumped in over the next 2 and ½ hours. After pumping was completed, the reaction mixture was kept at 60° C. under nitrogen with stirring. The next day, it was precipitated into an excess of hexane, redissolved in a minimum amount of THF, then reprecipitated into hexane. The sample was then dried under vacuum at 60° C. at $10^{-3}$ torr. The final yield of purified copolymer was 6 g (40%). $^{13}$C NMR indicated that the VIMA/iPMAM ratio was 13/87.

Copolymerization of N-methyl-N-vinylacetamide (VIMA) and Ethylmaleimide (EME)

VIMA monomer was purchased from Aldrich and purified by distillation. EME monomer was used as received from Aldrich. Anhydrous benzene was purchased from Aldrich and transferred under an inert atmosphere. AIBN was recrystallized from methanol.

11.4 g (0.115 moles) VIMA monomer and 3.6 g (0.029 moles) EME monomer were dissolved in 154 mL benzene, loaded into a three-necked flask fitted with a condenser, a thermometer, and a nitrogen inlet/outlet, and purged with nitrogen for one hour. The solution was then heated to 60° C. The reaction was initiated by injecting an AIBN solution (0.115 g in 2 cc benzene) into the mixture. The reaction mixture was maintained at 60° C. overnight, which resulted in a slightly viscous solution. The next day, the polymer was precipitated into hexane, dissolved into acetone, then reprecipitated into hexane. The reaction product was then dried at 40° C. and $10^{-3}$ torr overnight. The reaction product was characterized by $^1$H and $^{13}$C NMR and GPC. The VIMA/EME ratio produced in the copolymer was about 62/38.

Copolymerization of VIMA and Other N-Vinyl Amides with Acrylamides, Maleimides, Carboxylates, and Cyclic Imino Ethers It will be apparent to those skilled in the art of polymer synthesis, that VIMA or higher N-vinyl amide analogs, such as N-vinyl-N-n-propylpropionamide and N-vinyl propionamide, will produce copolymers with various carboxylates, cyclic imino ethers, and various other acrylamides and maleimides using procedures substantially similar to those described above for VIMA/iPMAM and VIMA/EME.

General Synthesis Procedure for Poly(N-allyl amides)

The synthesis of poly(N-allyl amides) is well known to those skilled in the art. The methods for controlling the rate of polymerization and the molecular weights for such polymers by using complexing agents, such as Lewis acids, and the appropriate initiator are disclosed in two patents, Canadian No. 1,251,892 and U.S. Pat. No. 4,644,042, and one patent application, European Application No. 84307460.0. Also, F. M. Menger et al., in *J. Org. Chem.*, 1995, 60, 6666–6667, disclose a technique for functionalizing a poly (allylamine) to produce a poly(N-allyl amide). Generally, the technique consists of acylating the amine group of a poly(allylamine). This reaction is conducted with the appropriate mole ratio of the poly(allylamine) and either an acyl chloride, $R_1COCl$, or a carboxylic acid, $R_1COOH$. A generic reaction sequence for producing a poly(N-allyl amide) is provided below:

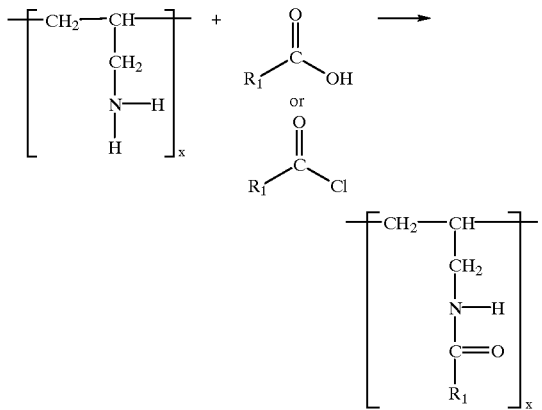

where $R_1$=a hydrocarbon group having one to six carbon atoms and zero to two heteroatoms selected from the group consisting of oxygen and nitrogen, and combinations thereof and x is an average number of units for producing an average molecular weight of between about 1,000 and about 6,000,000 for the final homopolymer product.

INHIBITOR EVALUATION

Mini-loop Testing Procedure

One method for evaluating an inhibitor's effectiveness uses a bench-scale high pressure apparatus referred to as a mini-loop apparatus. A mini-loop apparatus consists of a loop of stainless steel tubing with about a one-half inch inside diameter and about ten feet in length. The loop also has a transparent section for observing the fluid flow in the loop and the onset of hydrate formation in the loop. Fluid comprising about 40% by volume synthetic sea water (SSW) solution having about 3.5% total ionized salts, 40% by volume hydrocarbon condensate (i.e., $C_6+$), and 20% by volume hydrocarbon gas mixture is circulated around the loop at constant pressure. The hydrocarbon gas mixture is comprised of about 76 mole % methane, 9 mole % ethane, 7 mole % propane, 5 mole % n-butane, 2 mole % iso-butane, and 1 mole % of $C_5+$. The inhibitor is typically injected into the loop as an aqueous solution to produce the desired weight percent concentration of inhibitor in the aqueous sea salt/gas solution. Generally, many hydrate inhibitors are evaluated at about 0.5 wt % of the aqueous sea salt/gas solution.

The fluid is circulated at a constant velocity of about 2.5 feet/second. The loop and its pump lay in a controlled temperature water bath for controlling the temperature of the fluid circulating in the loop. The bath's water is circulated to ensure uniform temperature throughout the bath and rapid heat transfer between the bath water and the loop. As the loop temperature changes or as hydrates form, the gas volume in the loop will change accordingly. Therefore, to maintain constant pressure in the loop a pressure compensating device is required. Such a device can be comprised of a gas cell and a hydraulic oil cell separated by a floating piston. So as the gas volume in the loop changes, oil may be added or removed from the oil cell to produce a commensurate addition or removal of gas to the loop. Mini-loop tests are typically run at a pressure of about 1,000 pounds per square inch gauge (p.s.i.g.). However, any pressure between 0 to 3,000 p.s.i.g. could be selected for evaluating an inhibitor's performance.

The temperature of the water bath is reduced at a constant rate, preferably about 6° F. or 3.3° C. per hour, from an initial temperature of about 70° F. or 21° C. At some temperature, clathrate hydrates begin to rapidly form. As the dissolved gas is used to form clathrate hydrates there is an abrupt and corresponding decrease in the volume of dissolved gas in the aqueous sea salt/gas solution. The temperature at which this abrupt decrease in the volume of dissolved gas is observed is known as the temperature of onset for hydrate formation ($T_{os}$). Recalling from the discussion above, the hydrate equilibrium dissociation temperature or $T_{eq}$ is the temperature below which hydrate formation is thermodynamically favored in an aqueous sea salt/gas solution without an inhibitor present. Therefore, another measure of an inhibitor's effectiveness is the difference between $T_{eq}$ and $T_{os}$ which is known as the inhibitor's subcooling, $T_{sub}$. Therefore, for a given pressure, the greater the subcooling the more effective the inhibitor. Typically, an aqueous sea salt/gas solution with no inhibitor present produces a $T_{sub}$ of about 6–7° F. or 3.3–3.9° C.

Mini-loop Test Results

Without limiting the scope of the invention, and for the purpose of illustrating the invention, various polymeric N-vinyl amide and acrylamide inhibitors were evaluated using the mini-loop testing procedure described above. The results of these evaluations, where available, are provided below.

TABLE 1

MINI-LOOP TEST RESULTS WITH POLYMERIC INHIBITORS

| INHIBITOR DESCRIPTION | RATIO within POLYMER | CONC. (WT %) | MINI-LOOP SUB-COOLING TEMP. (° F.) | MINI-LOOP SUB-COOLING TEMP. (° C.) |
|---|---|---|---|---|
| None | NA | NA | 7.0 | 3.9 |
| PVIMA | NA | 0.5 | 12.5 | 6.9 |
| PDEAM | NA | 0.5 | 21.5 | 11.9 |
| PAPYD | NA | 0.5 | 25.2 | 14.0 |
| PAPID | NA | 0.5 | 11.5 | 6.4 |
| PiPMAM | NA | 0.5 | 24.0 | 13.3 |
| PVCap | NA | 0.25 | 19.0 | 10.6 |
| PVCap | NA | 0.5 | 22.5 | 12.5 |
| PVIMA, PVCap Mixture | NA | 0.25, 0.25 | 22.3 | 12.4 |
| VIMA/VCap | 50:50 | 0.5 | 29.0 | 16.1 |
| DMAM/EME | 52:48 | 0.5 | 17.2 | 9.6 |
| VIMA/DEAM | 37:63 | 0.5 | 18.0 | 10.0 |
| VIMA/AHMI | 52:48 | 0.5. | 21.5 | 11.9 |
| VIMA/iPMAM | 13:87 | 0.5 | 27.0 | 15.0 |
| VIMA/iPMAM | 17:83 | 0.5 | 25.0 | 13.9 |
| VIMA/iPMAM | 37:63 | 0.5 | 29.5 | 16.4 |
| VIMA/iPMAM | 40:60 | 0.5 | 29.0 | 16.1 |
| VIMA/iPMAM | 47:53 | 0.5 | 30.0 | 16.7 |
| VIMA/iPMAM | 50:50 | 0.5 | 31.5 | 17.5 |
| VIMA/iPMAM | 73:27 | 0.5 | 25.5 | 14.2 |
| VIMA/APYD | 31:69 | 0.5 | 28.0 | 15.6 |
| VIMA/MAPYD | 40:60 | 0.5 | 29.5 | 16.4 |

TABLE 1-continued

MINI-LOOP TEST RESULTS WITH POLYMERIC INHIBITORS

| INHIBITOR DESCRIPTION | RATIO within POLYMER | CONC. (WT %) | MINI-LOOP SUB-COOLING TEMP. (° F.) | MINI-LOOP SUB-COOLING TEMP. (° C.) |
|---|---|---|---|---|
| VIMA/APID | 40:60 | 0.5 | 24.2 | 13.4 |
| VIMA/APID | 46:54 | 0.5 | 24.2 | 13.4 |
| VIMA/VBu | 51:49 | 0.5 | 24.7 | 13.7 |
| VIMA/EME | 62:38 | 0.5 | 20.0 | 11.1 |
| VIMA/DMAM/EME | 30:54:16 | 0.5 | 18.0 | 10.0 |

Generally, copolymerizing N-vinyl amides, such as VIMA, with other water soluble polymers, such as various acrylamides (e.g., AHMI, iPMAM, APYD, MAPYD, and APID), carboxylates (e.g., VBu), and maleimides (e.g., EME), produced an unexpected improvement over the corresponding homopolymer's inhibitor performance. As indicated above, the VIMA homopolymer's subcooling was either about equal to or significantly less than the subcooling for other known homopolymer inhibitors, such as PDEAM, PAPYD, PAPID, or PiPMAM. Also, a simple mixture of a poly(N-vinyl amide), such as PVIMA, with a second water soluble polymer, such as PVCap, slightly diminishes the inhibition activity of the second polymer, when comparing systems having the same total inhibitor concentrations. For example, compare the results for the PVIMA, PVCap mixture having equal weight percentages of each homopolymer, 0.25 wt % for a total 0.5 wt % concentration, to the corresponding copolymer having a 50:50 mole ratio of VIMA/VCap at a total 0.5wt %. The 50-50 PVIMA-VCap mixture has a slightly lower subcooling, 22.3° F. (12.4° C.), compared to the PVCap homopolymer's subcooling, 22.5° F. (12.5° C.). However, the copolymer with a 50:50 mole ratio of VIMA/VCap produced a substantially higher subcooling, 29.0° F. (16.1° C.), versus that of the PVCap homopolymer.

Consequently, it was unexpected that copolymerizing an N-vinyl amide, such as VIMA, with the monomers used for producing other known homopolymer inhibitors would enhance, rather than diminish, the corresponding homopolymer's inhibition activity. PDEAM is the only anomaly among this otherwise consistent and unexpected influence that an N-vinyl amide, such as VIMA, can have when used to produce a copolymer, terpolymer, or other complex polymer. With the exception of VIMA/DEAM, three other VIMA copolymers, VIMA/APYD, VIMA/APID, and VIMA/iPMAM, demonstrated an improvement in subcooling by about 10% to 100% over the corresponding acrylamide homopolymer.

We believe that VIMA is similarly enhancing the inhibition activity of other acrylamides (e.g, AHMI), carboxylates (e.g., VBu), and maleimides (e.g., EME). Also, other members of the N-vinyl amide family, such as poly(N-vinyl propionamide) and poly(N-vinyl-N-n-propylpropionamide), may also demonstrate a similar synergism when polymerized with one or more other monomers selected from the class of acrylamides, carboxylates, or maleimides.

Mini-loop test results are not yet available for other members of the N-vinyl amide family, such as poly(N-vinyl propionamide) and poly(N-vinyl-N-n-propylpropionamide), or for the preferred poly(N-allyl amide) candidates specified above for inhibitor evaluation. Nonetheless, based on an inhibitor design method disclosed in a copending patent application, now U.S. Pat. No. 5,900,516, these polymers are expected to have a $T_{sub}$ of at least 12.5° F. or 6.9° C.

The means and method for practicing the invention and the best mode contemplated for practicing the invention have been described. It is to be understood that the foregoing is illustrative only and that other means and techniques can be employed without departing from the true scope of the invention as claimed herein.

We claim:

1. A method for inhibiting the formation of clathrate hydrates in a fluid having hydrate forming constituents, said method comprising treating said fluid with an effective amount of an inhibitor comprising a substantially water soluble copolymer of N-vinyl amide and a comonomer selected from the group consisting of acrylamides, methacrylamides, acrylates, vinyl carboxylates and alkenylcyclic imino ethers, wherein the copolymer has an average molecular weight between about 1000 and 6,000,000 and wherein the N-vinyl amide unit is represented by the following formula:

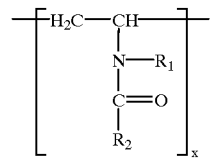

where, $R_1$ is a hydrogen or hydrocarbon group having one to six carbon atoms, and zero to two heteroatoms selected from the group consisting of oxygen, nitrogen, and combinations thereof, $R_2$ is a hydrocarbon group having one to six carbon atoms, and zero to two heteroatoms selected from the group consisting of oxygen, nitrogen, and combinations thereof, and $R_1$ and $R_2$ have a sum total of carbon atoms greater than or equal to one, but less than eight.

2. The method of claim 1 wherein $R_1$ is hydrogen or an alkyl, cycloalkyl, or aryl group having one to six carbon atoms, and $R_2$ is an alkyl, cycloalkyl, or aryl group having one to six carbon atoms.

3. The method of claim 1 wherein said polymer is a copolymer having said N-vinyl amide and a comonomer selected from the group consisting of diethylacrylamide, N-isopropylmethacrylamide, acryloylpyrrolidine, methacryloylpyrrolidine, acryloylhexamethyleneimine, acryloylpiperidine, and vinyl butyrate.

4. The method of claim 3 wherein the N-vinyl amide is N-vinyl N-methyl acetamide.

5. The method of claim 4 wherein the fluid is a petroleum fluid conveyed under conditions that would allow formation of clathrate hydrates.

6. The method of claim 1 wherein said inhibitor comprises a mixture of a first additive consisting essentially of said polymer and at least a second additive.

7. The method of claim 6 wherein said second additive is selected from the group consisting of poly (vinylpyrrolidone), poly(vinylcaprolactam), poly(N-vinyl-N-methylacetamide), a copolymer of N-vinyl-N-methylacetamide and isopropylmethacrylamide, a copolymer of N-vinyl-N-methylacetamide and acryloylpyrrolidine, a copolymer of N-vinyl-N-methylacetamide and methacryloylpyrrolidine, and a copolymer of N-vinyl-N-methylacetamide and acryloylpiperidine.

8. A method for inhibiting the formation of clathrate hydrates in a fluid having hydrate forming constituents, said method comprising treating said fluid with an effective amount of an inhibitor comprising a substantially water soluble polymer having the following N-allyl amide unit:

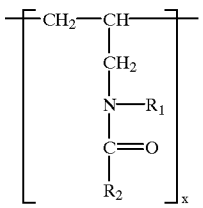

where,

R$_1$ is a hydrogen or hydrocarbon group having one to six carbon atoms, and zero to two heteroatoms selected from the group consisting of oxygen, nitrogen, and combinations thereof, R$_2$ is a hydrocarbon group having one to six carbon atoms, and zero to two heteroatoms selected from the group consisting of oxygen, nitrogen, and combinations thereof, R$_1$ and R$_2$ have a sum total of carbon atoms greater than or equal to one, but less than eight, and x is an average number of units for producing an average molecular weight for said polymer between about 1,000 and about 6,000,000.

9. The method of claim 8 wherein R$_1$ is hydrogen or an alkyl, cycloalkyl, or aryl group having one to six carbon atoms, and R$_2$ is an alkyl, cycloalkyl, or aryl group having one to six carbon atoms.

10. The method of claim 8 wherein said polymer is a copolymer having a first said N-allyl amide unit and a second N-allyl amide unit or a terpolymer having first said N-allyl amide unit, a second said N-allyl amide unit, and a third said N-allyl amide unit.

11. The method of claim 8 wherein said inhibitor comprises a mixture of a first additive consisting essentially of said polymer and at least a second additive.

12. The method of claim 11 wherein said second additive is selected from the group consisting of poly(vinylpyrrolidone), poly(vinylcaprolactam), poly(N-vinyl-N-methylacetamide), a copolymer of N-vinyl-N-methylacetamide and isopropylmethacrylamide, a copolymer of N-vinyl-N-methylacetamide and acryloylpyrrolidine, a copolymer of N-vinyl-N-methylacetamide and methacryloylpyrrolidine, and a copolymer of N-vinyl-N-methylacetamide and acryloylpiperidine.

13. The method of claim 8 wherein the polymer is a copolymer of an N-allyl amnide and a comonomer selected from the group consisting of acrylamides, methacrylamides, maleimides, acrylates, vinyl carboxylates, alkenylcyclic imino ethers, and N-vinyl amides.

14. The method of claim 13 wherein the fluid is a petroleum fluid conveyed under conditions that would allow formation of clathrate hydrates.

15. The method of claim 14 wherein the copolymer is mixed with a carrier solvent prior to treating the fluid, and wherein the carrier solvent is selected from the group consisting of water, brine, sea water, produced water, methanol, ethanol, propanol, isopropanol, glycol, and mixtures thereof.

16. The method of claim 14 wherein the inhibitor is provided in an aqueous solution, such that the copolymer is present in an aqueous phase in the fluid at a concentration of about 0.5 wt %.

17. The method of claim 16 wherein the fluid is conveyed in a pipe.

18. A method for inhibiting the formation of gas hydrates in a petroleum fluid having hydrate-forming constituents and conveyed under conditions that would allow formation of gas hydrates, said method comprising:

treating the fluid with an amount of an inhibitor sufficient to inhibit the formation of gas hydrates; and conveying the petroleum fluid;

wherein the inhibitor is a copolymer of an N-vinyl N-methyl acetamide monomer and a comonomer selected from the group consisting of acrylamides, methacrylamides, acrylates, vinyl carboxylates, and alkenylcyclic imino ethers.

19. The method of claim 18 wherein the comonomer is selected from the group consisting of diethylacrylamide, N-isopropyl methacrylamide, acryloylpyrrolidine, methacryloylpyrrolidine, acryloylhexamethyleneimine, acryloylpiperidine, and vinyl butyrate.

20. The method of claim 19 wherein the copolymer is mixed with a carrier solvent prior to treating the fluid, and wherein the carrier solvent is selected from the group consisting of water, brine, sea water, produced water, methanol, ethanol, propanol, isopropanol, glycol, and mixtures thereof.

21. The method of claim 19 wherein the inhibitor is a copolymer of N-vinyl N-methyl acetamide and an N-substituted methacrylamide.

22. The method of claim 21 wherein the inhibitor is provided in an aqueous solution.

23. The method of claim 22 wherein the N-substituted methacrylamide is selected from the group consisting of N-isopropyl methacrylamide and methacryloylpyrrolidine.

24. The method of claim 23 wherein the copolymer is present in an aqueous phase in the fluid at a concentration of about 0.5 wt %.

25. The method of claim 24 wherein the inhibitor is an N-vinyl N-methyl acetamide/N-isopropyl methacrylamide copolymer.

26. The method of claim 25 wherein the copolymer has from about 13% to about 50% N-vinyl N-methyl acetamide units and from about 50% to about 87% N-isopropyl methacrylamide units.

27. The method of claim 26 wherein the fluid is conveyed in a pipe.

* * * * *